United States Patent [19]

Hase et al.

[11] Patent Number: 4,631,445
[45] Date of Patent: Dec. 23, 1986

[54] MONOCHROME DISPLAY CATHODE RAY TUBE WITH LONG AFTER GLOW PHOSPHORS

[75] Inventors: Takashi Hase; Hidemi Yoshida; Hideo Suzuki; Morio Hayakawa, all of Odawara, Japan

[73] Assignee: Kasei Optonix, Ltd., Tokyo, Japan

[21] Appl. No.: 592,946

[22] Filed: Mar. 23, 1984

[30] Foreign Application Priority Data

Mar. 23, 1983 [JP] Japan .............................. 58-40778[U]

[51] Int. Cl.$^4$ ........................ H01J 29/20; C09K 11/54
[52] U.S. Cl. ................................ 313/467; 252/301.6 S
[58] Field of Search .............................. 313/467, 468; 252/301.4 R, 301.6 S

[56] References Cited

U.S. PATENT DOCUMENTS

| B 381,709 | 10/1976 | Lipp | 313/467 |
| 3,394,084 | 7/1968 | Avella | 252/301.4 R |
| 3,922,233 | 11/1975 | Torii et al. | 252/301.4 R |
| 4,340,839 | 7/1982 | Fujita et al. | 313/467 |
| 4,512,912 | 4/1985 | Matsuda et al. | 313/468 X |

Primary Examiner—Palmer C. DeMeo
Assistant Examiner—Sandra L. O'Shea
Attorney, Agent, or Firm—Oblon, Fisher, Spivak, McClelland, & Maier

[57] ABSTRACT

A monochrome display cathode ray tube which comprises a white emitting fluorescent screen formed on a face plate facing an electron gun to emit cathode rays, said white emitting fluorescent screen being composed essentially of a phosphor mixture comprising from 40 to 70% by weight of a long after-glow red emitting europium-activated indium borate phosphor, from 10 to 40% by weight of a long after-glow green emitting manganese-activated zinc silicate phosphor and from 10 to 50% by weight of a long after-glow blue emitting silver-activated zinc sulfide phosphor.

9 Claims, 4 Drawing Figures

MONOCHROME DISPLAY CATHODE RAY TUBE WITH LONG AFTER GLOW PHOSPHORS

The present invention relates to a monochrome display cathode ray tube for white color emission. More particularly, it relates to a monochrome display cathode ray tube having a long after-glow white emitting fluorescent screen which presents high luminance and minimum color unevenness.

In recent years, it has been desired to use high resolution display cathode ray tubes for terminal display units of a computer system or for display units of an aircraft control system, which are designed to display fine letters, characters or symbols.

The fluorescent screens for such high resolution display cathode ray tubes are required to be made of a long after-glow phosphor. If the fluorescent screens for the cathode ray tubes are otherwise made of a short after-glow phosphor, the image thereby obtainable, tends to flicker because the scanning speed is low. In general, the phosphor constituting a fluorescent screen for a high resolution display cathode ray tube, is required to have an after-glow period of from 10 times to some tens times that of the short after-glow phosphor constituting a fluorescent screen of an ordinary cathode ray tube. In this specification, the "after-glow period" means a "10% luminance after-glow period" which is a period of time required for the emission luminance to decrease to 10% of the emission luminance under excitation, after the excitation of the phosphor is stopped.

Further, with a recent trend for a wide range of applications of cathode ray tubes of this type as display devices, there has been a movement for applying human engineering to this field, with a view to improving the operability and operation efficiency and minimizing the fatigue of eyes.

Accordingly, cathode ray tubes for display devices are desired to satisfy various requirements as follows.

(1) No flickering (The fluorescent screen has an after-glow period suitable for the frame frequency of the cathode ray tube.)

(2) High brightness (If the luminance of the phosphor is high, it is possible to increase the contrast of the fluorescent screen as the case requires.)

(3) Easy to see (The emitted light shows a specific color such as orange-yellow, green or white.)

(4) Capable of presenting a high resolution display (The beam diameter of the cathode ray tube is sufficiency small.)

(5) Free from hazardous substances (If hazardous substances are involved, practical applications will be difficult particularly in Japan.)

(6) Little deterioration (The brightness drop or the consequential color shift of the fluorescent screen is minimum.)

In particular, white emitting high resolution monochrome display cathode ray tubes (hereinafter referred to simply as "cathode ray tubes") are widely used for display devices as they bring about little eye strain even when they are watched for a long period of time.

The present inventors have conducted extensive researches on the white emitting cathode ray tubes to satisfy the requirements from the aspect of the human engineering. Taking it into account that most of the desired characteristics of the cathode ray tubes are derived from the properties of the phosphor used in the cathode ray tubes, the present inventors have studied long after-glow white emitting phosphors. As such phosphors, those identified as "Conventional" in Table 1 given hereinafter, are known. However, none of such conventional phosphors fully satisfies the above-mentioned requirements. Generally, it is common, in many cases, to employ a phosphor mixture comprising a green emitting manganese-activated zinc silicate phosphor (P39 phosphor), a red emitting manganese-activated zinc phosphate phosphor (P27 phosphor) and a short after-glow blue emitting silver-activated zinc sulfide phosphor (P22-B phophor), which are most preferable among the conventional phosphors (particularly in Japan with a view to avoiding cadmium pollution).

However, the after-glow characteristics curves of the mixed phosphors are considerably different from one another, and accordingly, there is a substantial color shift in the after-glow relative to the emitting color. Moreover, the luminance is inadequate, and the above-mentioned requirements from the aspect of the human engineering are not satisfied.

As a result of a further research with an aim to provide an improved cathode ray tube which is free from the drawbacks inherent to the cathode ray tube having a fluorescent screen composed of a phosphor mixture comprising the above-mentioned P39 phosphor, P27 phosphor and P22-B phosphor, the present inventors have found that the above requirements can be fully satisfied by a cathode ray tube wherein the fluorescent screen is made of a novel phosphor mixture and especially when such a fluorescent screen is combined with an electron gun for scanning certain specific cathode rays. The present invention is based on this discovery.

Namely, the present invention provides a monochrome display cathode ray tube which comprises a white emitting fluorescent screen formed on a face plate facing an electron gun to emit cathode rays, said white emitting fluorescent screen being composed essentially of a phosphor mixture comprising from 40 to 70% by weight of a long after-glow red emitting europium-activated indium borate phosphor, from 10 to 40% by weight of a long after-glow green emitting manganese-activated zinc silicate phosphor and from 10 to 50% by weight of a long after-glow blue emitting silver-activated zinc sulfide phosphor.

The fluorescent screen of the cathode ray tube of the present invention may be composed solely of the above long after-glow white emitting phosphor mixture, or it may be composed of a combination of such a phosphor mixture with a small amount of other phosphors to adjust the emitting color or the after-glow period. In the present invention, the frame frequency represents a number of scanning times per second, over an image in e.g. a raster scanning display or a random scanning display.

Further, in this specification, the after-glow period is represented by a value measured at a current density of the excitation electron beams emitted from the electron gun being 0.4 $\mu A/cm^2$. The beam diameter of the cathode rays can not directly be measured. Accordingly, in the present invention, the beam diameter as measured on the fluorescent screen corresponds to a $\phi_{10}$ value (a spot diameter taken at a position corresponding to 10% of the peak luminance in the luminance distribution) of the emission intensity distribution of a luminous spot at a just focus portion when cathode ray beam is irradiated onto the fluorescent screen.

Now, the present invention will be described in detail with reference to the preferred embodiments.

In the accompanying drawings.

Figure 1:
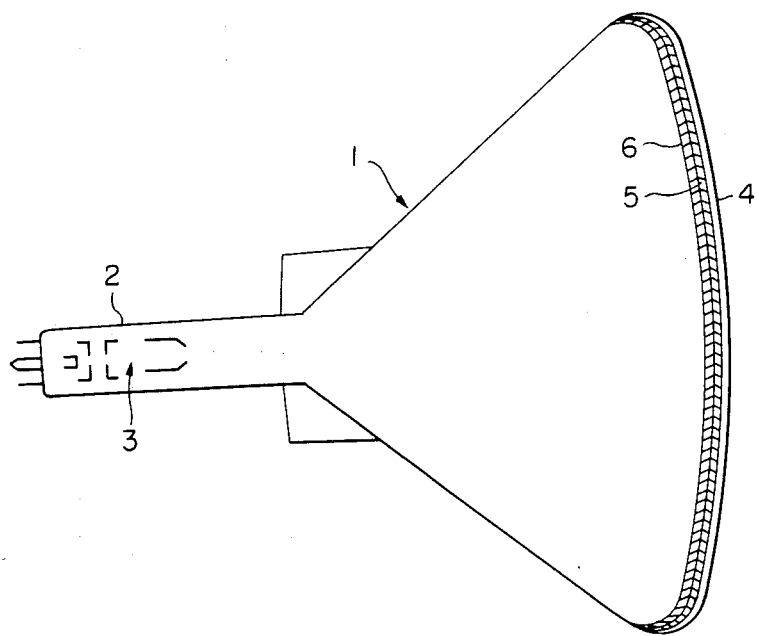
FIG. 1 is a diagrammatic cross sectional view of a cathode ray tube of the present invention.

The cathode ray tube of the present invention is substantially the same as a conventional monochrome cathode ray tube such as a black and white television cathode ray tube except for the electron gun (inclusive of the efficiency of the electron gun) and the construction of the fluorescent screen. Namely, as shown in FIG. 1, the cathode ray tube unit of the present invention comprises a cathode ray tube wherein a fluorescent screen 5 is formed on the entire surface of the face plate 4 facing an electron gun 3 provided at a neck portion 2 of a funnel 1 (usually, a vapour-deposited aluminum film 6 is provided on the rear side of the fluorescent screen 5 to prevent charge-up during excitation), and a device for operating the cathode ray tube. Here, the main portion of the fluorescent screen 5 is composed of a specific long after-glow white emitting phosphor mixture, and the above electron gun 3 is capable of emitting cathode rays having a specific frame frequency and a specific beam diameter.

The fluorescent screen 5 of the cathode ray tube of the present invention is composed of a long after-glow white emitting phosphor mixture. The phosphor mixture is obtained by mixing a long after-glow red emitting europium-activated indium borate phosphor, a long after-glow green emitting manganese-activated zinc silicate phosphor and a long after-glow blue emitting silver-activated zinc sulfide phosphor.

The above europium-activated indium borate phosphor is a phosphor which has not been practically used because its emitting color is reddish orange which is not commonly employed. In the present invention, a europium-activated indium borate phosphor represented by the formula:

$$(In_{1-x}M_x^{III})BO_3:Eu_yLn_z$$

where $M^{III}$ is at least one element selected from the group consisting of Sc, Y, Gd, Lu, La, Al, In, Bi and Ga, Ln is at least one element selected from the group consisting of Tb, Pr, Sm and Dy, and x, y and z are $0 \leq x \leq 0.3$, $0.002 \leq y \leq 0.2$ and $0 \leq z \leq 0.001$, respectively (hereinafter referred to simply as "a borate phosphor") is particularly preferred in view of the luminance and the after-glow characteristics.

The above-mentioned long after-glow green emitting manganese-activated zinc silicate phosphor is a phosphor which has been commonly used as a green emitting phosphor component in the conventional display cathode tube as mentioned above. In the present invention, a manganese-activated zinc silicate phosphor represented by the formula:

$$Zn_2SiO_4:Mn_aMe_b$$

where Me is at least one of Sb and Bi, and a and b are $0.00005 \leq a \leq 0.03$ and $0 \leq b \leq 0.01$, respectively (hereinafter referred to simply as "a silicate phosphor") is particularly preferred in view of the luminance and the after-glow characteristics. Particularly preferred is the one wherein Me is Sb.

The silicate phosphor may contain a very small amount of arsenic. From the viewpoints of the after-glow characteristics, pollution and luminance, the arsenic content should be limited to a level of at most 0.00006 mol based on the host of the phosphor. (However, in a case where avoidance of pollution is strictly required, it is advisable to eliminate arsenic.)

Further, in the silicate phosphor, a part of Zn may be substituted by Mg or Ba, and a part of Si may be substituted by Ge.

On the other hand, the above-mentioned long afterglow blue emitting silver-activated zinc sulfide phosphor is a phosphor as disclosed by the present applicant in Japanese Patent Application Nos. 176170/1981, 181624/1981, 180721/1981, 1133/1982, 212278/1981 and 12866/1982.

In the present invention, a zinc sulfide phosphor coactivated by silver and at least one of gallium and indium and represented by the formula:

$$ZnS:Ag_{a'}X_{b'}Y_{c'}Z_{d'}$$

where X is at least one of Ga and In, Y is at least one of Cu and Au, Z is at least one element selected from the group consisting of Al, Cl, I, Br and F, and a', b', c' and d' represent from $5 \times 10^{-4}$ to $10^{-1}$% by weight, from $10^{-6}$ to $5 \times 10^{-1}$% by weight, at most $2 \times 10^{-2}$% by weight and from $5 \times 10^{-6}$ to $5 \times 10^{-2}$% by weight, respectively (hereinafter referred to simply as "a long after-glow zinc sulfide phosphor") is particularly preferred in view of the luminance and the after-glow characteristics. Particularly preferred is the one where X is Ga and Z is at least one of Al and Cl.

Figure 2:
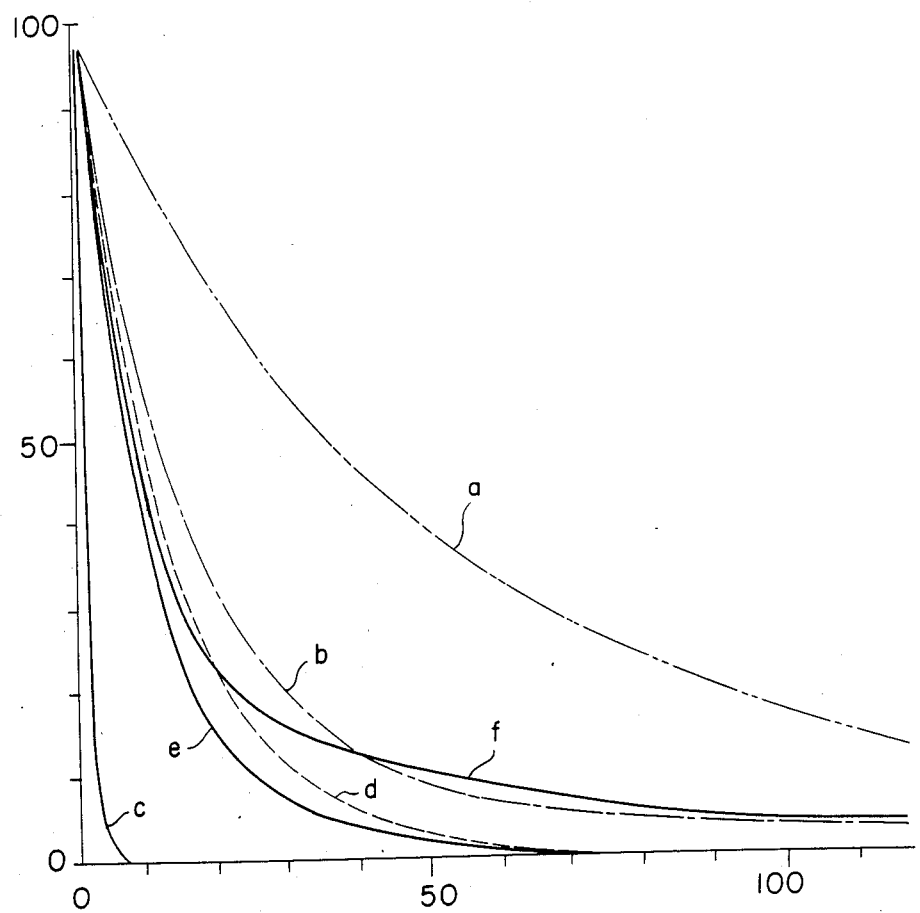
FIG. 2 is a graph showing the after-glow characteristics.
Figure 3:
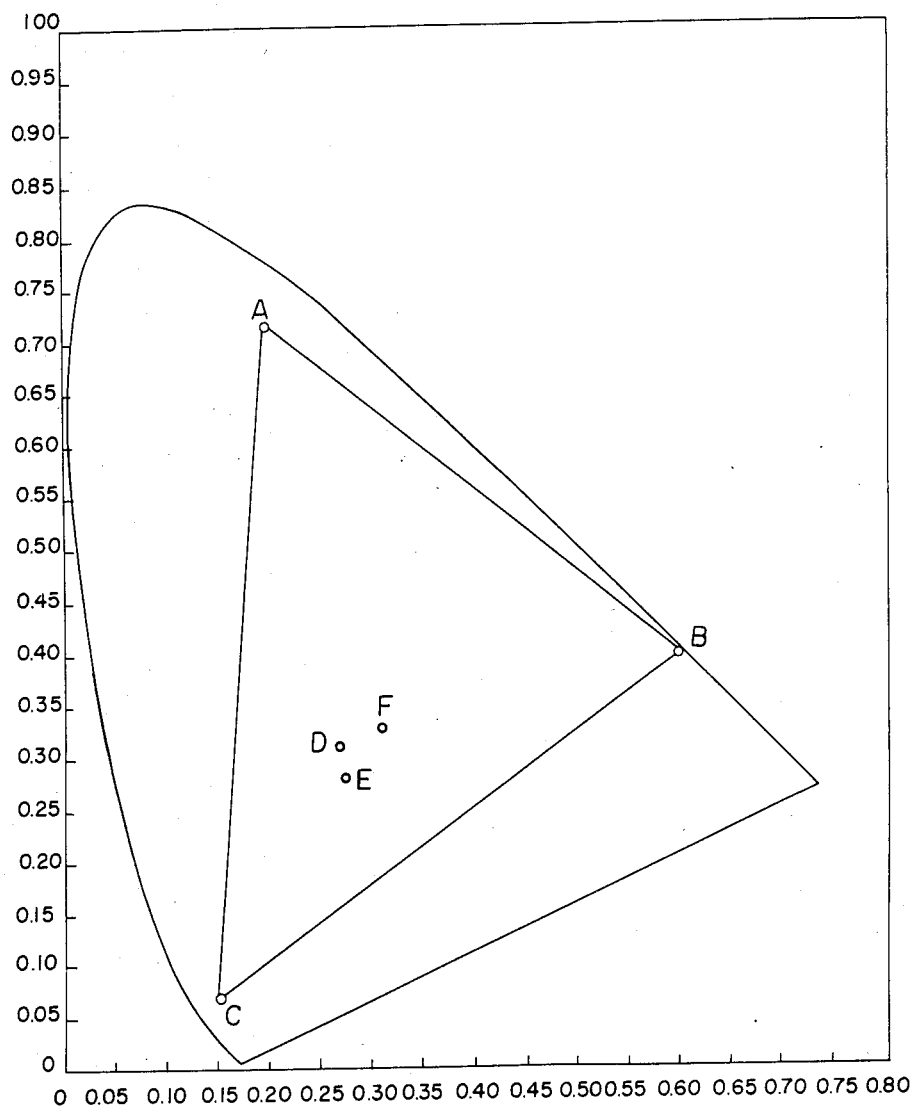
FIG. 3 is a CIE chromaticity diagram.

Referring to FIG. 2, the after-glow characteristics of the borate phosphor, the silicate phosphor and the long after-glow zinc sulfide phosphor are represented by curve e, curves d and b and curve f, respectively. Their after-glow periods are shorter than that of the conventional P27 phosphor (curve a). Nevertheless, there will be no unnecessary dragging of the after-glow, and the image will be sharp. Further, as compared with the conventional P22-B phosphor (curve c), they have a sufficiently long after-glow. Moreover, the after-glow characteristics of these phosphors are all alike, and no color shift in the after-glow is observed by necked eyes. Further, they have a feature that no color shift will be formed in the after-glow characteristics at any mixing ratio. In the CIE chromaticity diagram of FIG. 3, the phosphor mixture comprising the borate phosphor (point B), the silicate phosphor (point A) and the long after-glow zinc sulfide phosphor (point C) may present any desired emitting color within the range defined by the lines connecting points B, A and C, depending upon the mixing ratio. However, in order to obtain a white emitting color and from the viewpoints of the color reproduction and the color shift due to an unbalanced mixing ratio, the mixing ratio (K) in the present invention is selected within a range of from 40 to 70% by weight of the borate phosphor, from 10 to 40% by weight of the silicate phosphor and from 10 to 50% by weight of the long after-glow zinc sulfide phosphor.

The phosphor mixture of the present invention is superior to the conventional phosphor mixture comprising the P27 phosphor, P39 phosphor and P22 phosphor, in that the phosphor mixture of the present invention provides a luminance higher by 40 to 70% or even more, than the luminance obtainable by the conventional phosphor mixture showing an emitting color closest to the emitting color of the phosphor mixture of the present invention. Further, each of the three phosphors constituting the phosphor mixture of the present invention shows no substantial brightness drop even when subjected to ageing for an extended period of time, and accordingly the phosphor mixture undergoes no substantial color shift.

The properties of the phosphor mixture of the present invention are given in Table 1 in comparison with the properties of the conventional phosphor mixture.

TABLE 1

| Phosphors used for the fluorescent screen | | After-glow | Luminance | Emitting color | Public hazard prevention | Brightness drop prevention | Commercialization |
|---|---|---|---|---|---|---|---|
| Conventional | | | | | | | |
| $(ZnMg)_3(PO_4)_2:Mn$ | Mixture | Poor (color shift) | Poor | Good | Good | Good | Yes |
| $Zn_2SiO_4:Mn$ | | | | | | | |
| $ZnS:Ag$ | | | | | | | |
| Present Invention Phosphor mixture used in the present invention | | Good | Excellent | Excellent | Excellent | Excellent | — |

Further, in the present invention, it is recommended to incorporate a pigment into the above fluorescent screen to impart a high contrast to it. For the incorporation of such a pigment, there may be mentioned a method wherein pigments having colors (reflectivities) corresponding to the emitting colors of the respective phosphors are deposited on the respective phosphors, or a method in which a black pigment (such as carbon black, black iron oxide or black tungsten) is mixed therewith or deposited thereon. In the present invention, the latter method is recommended.

In the cathode ray tube of the present invention, the properties may be improved by incorporating, e.g., $ZnS:Cu,Al$, $ZnS:Cu,Al,Ga$, $ZnS:Au,Al$, $ZnS:Au,Al,Ga$, $ZnS:Cu,Au,Al$, $ZnS:Cu,Cl$, $Ln_2O_2S:Eu$ or Tb (where Ln is at least one element selected from the group consisting of La, Y, Gd and Lu; the same applies hereinafter), $Ln_2O_3:Eu$, $LnVO_4:Eu$, $Ln_2O_3:Eu,Dy$, P27, P13, P25ZnS:Ag, into the above phosphor mixture. Further, it is possible to improve the sensitivity to light pens by incorporating, e.g., $Y_2SiO_5:Ce$, $Y_3Al_5O_{12}:Ce$, $Y_3(AlGa)_5O_{12}:Ce$, $YAlO_3:Ce$ or $ZnO:Zn$.

In the display cathode ray tube, it is necessary to emit cathode rays having a small beam diameter as measured on the fluorescent screen, to improve the resolution. In this case, in order to provide adequate excitation energy to each spot, it is necessary to apply cathode rays to each spot for a certain period of time. Accordingly, in order to obtain adequate luminance as well as the high resolution, it is obliged to lower the frame frequency. For this reason, the phosphor is required to have a predetermined level of the after-glow characteristics, and is preferably the one which has adequate luminance without bringing about a color shift.

According to the cathode ray tube of the present invention, a better image quality is obtainable at the time of such cathode ray irradiation, as compared with the conventional cathode ray tube. In the cathode ray tube unit of the present invention, it is preferred to employ, in addition to the above-mentioned fluroescent screen, specific cathode rays having a frame frequency of from 25 to 75 Hz, preferably from 25 to 50 Hz and a beam diameter of from 0.05 to 2.00 mm, preferably from 0.05 to 0.4 mm, as measured on the fluorescent screen, as the cathode rays emitted from the electron gun. In the cathode ray tube of the present invention, particularly good results will be obtained when the frame frequency is from 30 to 50 Hz. Namely, according to the cathode ray tube of the present invention, by the combination of the specific scanning cathode rays and the specified fluorescent screen, it is possible to obtain a bright screen which is substantially free from flickering as compared with the conventional cathode ray tube and which is brighter by 1.5 to 2 times than the conventional screen, to obtain a white emitting image which is easy to see and to obtain a high resolution display which is free from public hazard and which undergoes no substantial brightness drop.

As described in the foregoing, the cathode ray tube of the present invention provides a white emitting image which has a high luminance and which adequately satisfies the various requirements based on human engineering, by means of the superior fluorescent screen and the specific cathode ray scanning. Thus, the industrial value of the present invention is considerably high.

Now, the present invention will be described with reference to Examples. However, it should be understood that the present invention is by no means restricted by these specific Examples.

EXAMPLE 1

Figure 4:
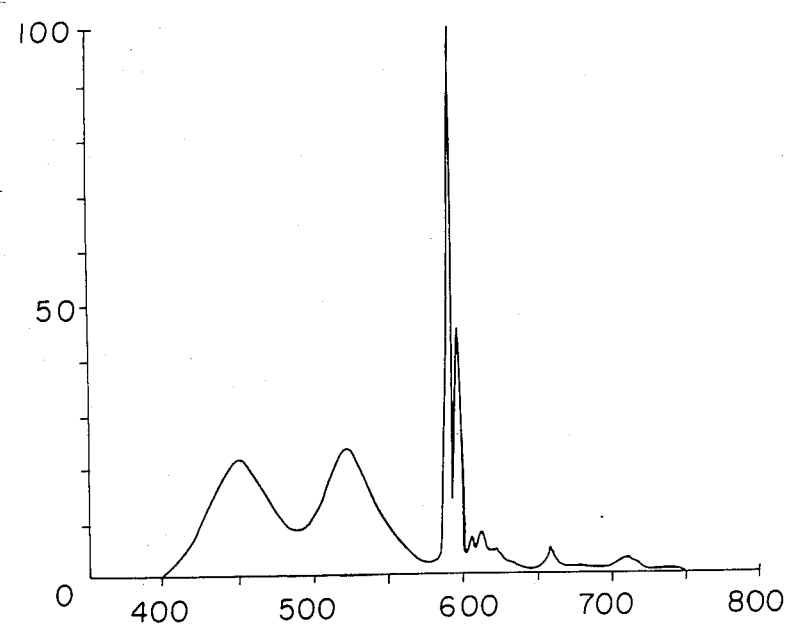
FIG. 4 is a graph showing an emission spectrum.

A slurry of a phosphor mixture obtained by thoroughly mixing 43 g of a borate phosphor ($InBO_3:Eu$) (average particle size: 7 μm) treated for surface treatment by at least one surface treating agent selected from the group consisting of a silicate, a phosphate, zinc hydroxide and an aluminate, 27 g of a silicate phosphor ($Zn_2SiO_4:Mn$, Sb) (average particle size: 7 μm) and 30 g of silver and gallium-activated zinc sulfide phosphor ($ZnS:AgGaCl$) (average particle size: 7 μm) together with e.g. a solvent, was applied by a known precipitation coating method to form a fluorescent screen on the inner surface of the face plate, followed by further processings such as filming, metal backing, etc., to obtain a cathode ray tube. Then, the scanning circuit for the electron gun, etc. are incorporated to complete a cathode ray tube unit. The various characteristics of the fluorescent screen of the cathode ray tube unit were measured by varying the frame frequency and the beam diameter, on the fluorescent screen, of the cathode rays emitted from the electron gun, whereby good image quality was obtained. The chromaticity point of this image showed a good white emitting color represented by (x, y)=(0.274, 0.314) i.e. point D in FIG. 3. (The emission spectrum of this case is shown in FIG. 4.) Further, the luminance of the screen was brighter by 1.5 times than that of the conventional cathode ray tube (having a fluorescent screen composed of a phosphor mixture comprising the P39 phosphor, P27 phosphor and P22 phosphor) showing a chromaticity point closest to point D. The after-glow period of the fluorescent screen was 30 milli second.

When subjected to ageing for an extended period of time, this cathode ray tube unit showed no substantial brightness drop of the fluorescent screen and no substantial color shift.

EXAMPLE 2

A cathode ray tube unit was prepared in the same manner as in Example 1 except that 43 g of a borate ( phosphor (InBO$_3$:Eu) (average particle size: 7.5 μm), 37 g of a silicate phosphor (Zn$_2$SiO$_4$:Mn, As, Sb, provided As is $1 \times 10^{-4}$ g atm/mole) (average particle size: 7.5 μm) and 30 g of a silver, copper and gallium-activated zinc sulfide phosphor (ZnS:AgCuGaCl) (average particle size of 7.5 μm) were used. This cathode ray tube unit exhibited a good image. The chromaticity point of this image showed a good white emitting color represented by (x, y)=(0.249, 0.290), i.e. point E in FIG. 3. Further, the luminance of the screen was brighter by 1.4 times than that of the conventional cathode ray tube showing a chromaticity point closest to point E. The after-glow period of the fluorescent screen was 25 milli second.

When subjected to ageing for an extended period of time, this cathode ray tube unit showed no substantial brightness drop of the fluorescent screen and no substantial color shift.

EXAMPLE 3

A cathode ray tube unit was prepared in the same manner as in Example 1 except that 50 g of a borate phosphor [(In$_{0.9}$Sc$_{0.1}$)BO$_3$:Eu] (average particle size: 8 μm), 23 g of a silicate phosphor (Zn$_2$SiO$_4$:Mn) (average particle size: 8 μm) and 27 g of a silver, gold and indium-activated zinc sulfide phosphor (ZnS:AgAuInCl) (average particle size: 8 μm) were used. This cathode ray tube exhibited a good image. The chromaticity point of this image showed a good white emitting color represented by (x, y)=(0.313, 0.333), i.e. point F in FIG. 3. Further, the luminance of the screen was brighter by 1.7 times than that of the conventional cathode ray tube showing a chromaticity point closest to point F. The after-glow period of the fluorescent screen was 30 milli second.

When subjected to ageing for an extended period of time, this cathode ray tube unit showed no substantial brightness drop of the fluorescent screen and no substantial color shift.

We claim:

1. A monochrome display cathode ray tube which comprises a white emitting fluorescent screen formed on a face plate facing an electron gun to emit cathode rays, said white emitting fluorescent screen comprising a phosphor mixture which comprises:

(a) from 40–70% by weight of a long after-glow red emitting europium-activated indium borate phosphor,
(b) from 10–40% by weight of a long after-glow green emitting manganese-activated zinc silicate phosphor, and
(c) from 10–50% by weight of a long after-glow blue emitting silver-activated zinc sulfide phosphor, which is a zinc sulfide phosphor co-activated by silver and at least one of gallium and indium and having the formula:

$$ZnS:Ag_{a'}X_{b'}Y_{c'}Z_{d'}$$

wherein X is at least one of Ga and In, Y is at least one of Cu and Au, Z is at least one element selected from the group consisting of Al, Cl, I, Br and F, and a', b', c' and d' represent from $5 \times 10^{-4}$ to $10^{-1}$% by weight, from $10^{-6}$ to $5 \times 10^{-1}$% by weight, at most $2 \times 10^{-2}$% by weight and from $5 \times 10^{-6}$ to $5 \times 10^{-2}$% by weight, respectively.

2. The cathode ray tube according to claim 1, wherein the europium-activated indium borate phosphor is represented by the formula:

$$(In_{1-x}M_x^{III})BO_3:Eu_yLn_z$$

where $M^{III}$ is at least one element selected from the group consisting of Sc, Y, Gd, Lu, La, Al, In, Bi and Ga, Ln is at least one element selected from the group consisting of Tb, Pr, Sm and Dy, and x, y and z are $0 \leq x \leq 0.3$, $0.002 \leq y \leq 0.2$ and $0 \leq z \leq 0.001$, respectively.

3. The cathode ray tube according to claim 1, wherein the manganese-activated zinc silicate phosphor is represented by the formula:

$$Zn_2SiO_4:Mn_aMe_b$$

where Me is at least one of Sb and Bi, and a and b are $0.00005 \leq a \leq 0.03$ and $0 \leq b \leq 0.01$, respectively.

4. The cathode ray tube according to claim 3, wherein Me is Sb.

5. The cathode ray tube according to claim 1, wherein X is Ga, and Z is at least one of Al and Cl.

6. The cathode ray tube according to claim 1, wherein the electron gun is capable of emitting cathode rays having a frame frequency of from 25 to 75 Hz and a beam diameter of from 0.05 to 2.00 mm as measured on the fluorescent screen.

7. The cathode ray tube according to claim 6, wherein the frame frequency is from 25 to 50 Hz and the beam diameter is from 0.05 to 0.4 mm.

8. The cathode ray tube according to claim 1, wherein said fluorescent screen further comprises a black tungsten pigment incorporated therein to impart high contrast to said screen.

9. The cathode ray tube according to claim 6, wherein said frame frequency is from 30 to 50 Hz.

* * * * *